United States Patent
Chiang et al.

(10) Patent No.: US 8,819,906 B2
(45) Date of Patent: Sep. 2, 2014

(54) METAL PART AND PLASTIC PART SEPERATING DEVICE

(75) Inventors: Chwan-Hwa Chiang, New Taipei (TW); Yi-Jun Huang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 527 days.

(21) Appl. No.: 13/169,786

(22) Filed: Jun. 27, 2011

(65) Prior Publication Data

US 2012/0227230 A1     Sep. 13, 2012

(30) Foreign Application Priority Data

Mar. 7, 2011   (CN) .......................... 2011 1 0053443

(51) Int. Cl.
*B23P 19/04*    (2006.01)
*B23Q 3/00*     (2006.01)
*B02C 1/00*     (2006.01)

(52) U.S. Cl.
USPC ............................ 29/239; 269/289 R; 241/19

(58) Field of Classification Search
CPC .... B08B 7/02; B29B 7/02; B29B 2017/0227; B09B 5/00; B29K 2705/00
USPC ............................ 29/239; 269/289 R; 241/19
See application file for complete search history.

(56) References Cited

U.S. PATENT DOCUMENTS

2011/0081491 A1*   4/2011   Sundall et al. ................ 427/322

* cited by examiner

*Primary Examiner* — Lee D Wilson
*Assistant Examiner* — Nirvana Deonauth
(74) *Attorney, Agent, or Firm* — Novak Druce Connolly Bove + Quigg LLP

(57) ABSTRACT

A composite part separating device for separating a composite product consisting of a plastic part and a metal part is provided. The composite part separating device includes a base; a workpiece support mounted on the base. The metal part of the composite product is hung on the workpiece support to retain the composite product on the workpiece support; a vibrating motor drives the base and the workpiece support to shake, causing the plastic part to separate from the metal part.

13 Claims, 5 Drawing Sheets

METAL PART AND PLASTIC PART SEPERATING DEVICE

BACKGROUND

1. Technical Field

This disclosure relates to separating devices, particularly to separating device for separating a metal part and a plastic part.

2. Description of Related Art

Insert molding process is a valuable technology and powerful product design process where a plastic part is molded directly over metal components, resulting in a single composite product. However, there are typically a few bad single composite products with bad plastic parts, where the metal components are still good. It can be difficult to separate bad plastic parts from good metal components. So, a typical way to deal with bad single composite products is to throw them away, but that is very wasteful of the good metal components.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary metal part and plastic part separating device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
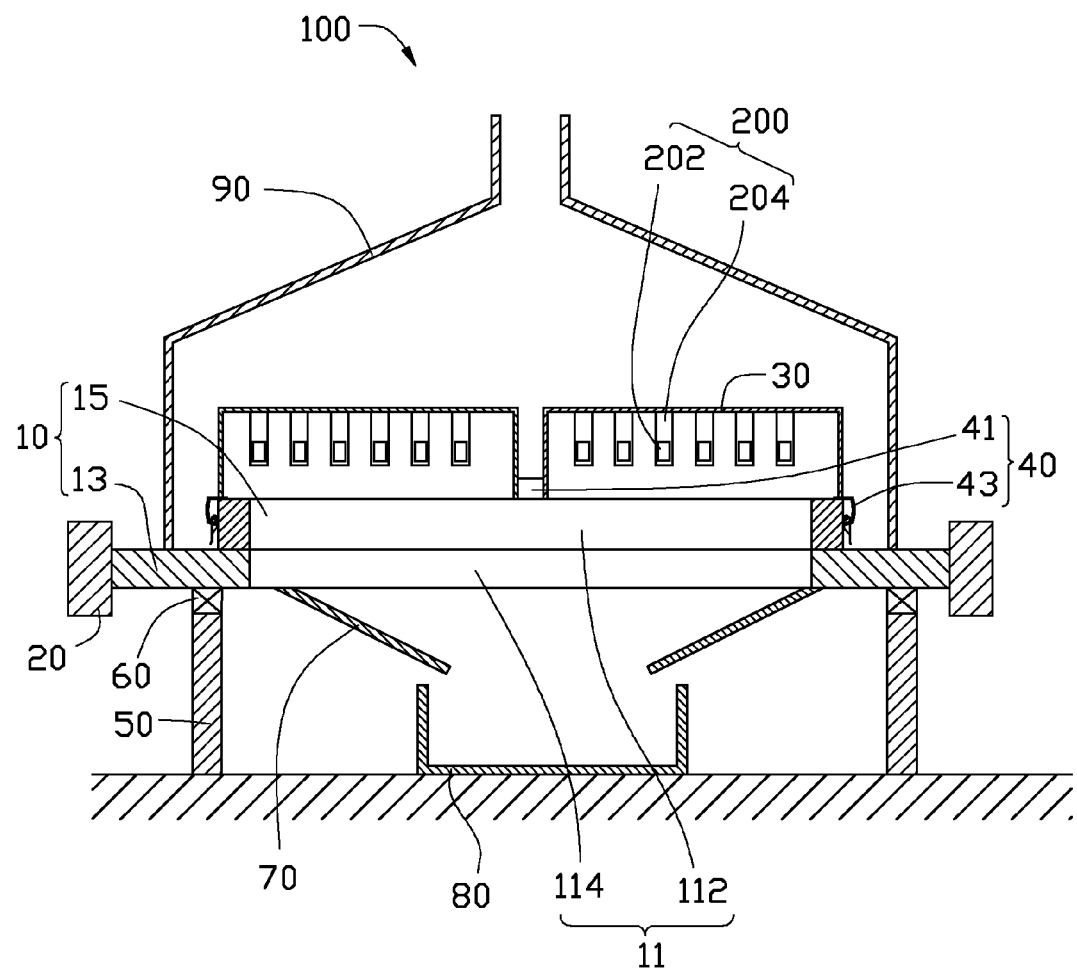
FIG. 1 is a cross-sectional view of an exemplary embodiment of a metal part and a plastic part, separating device.
Figure 2:
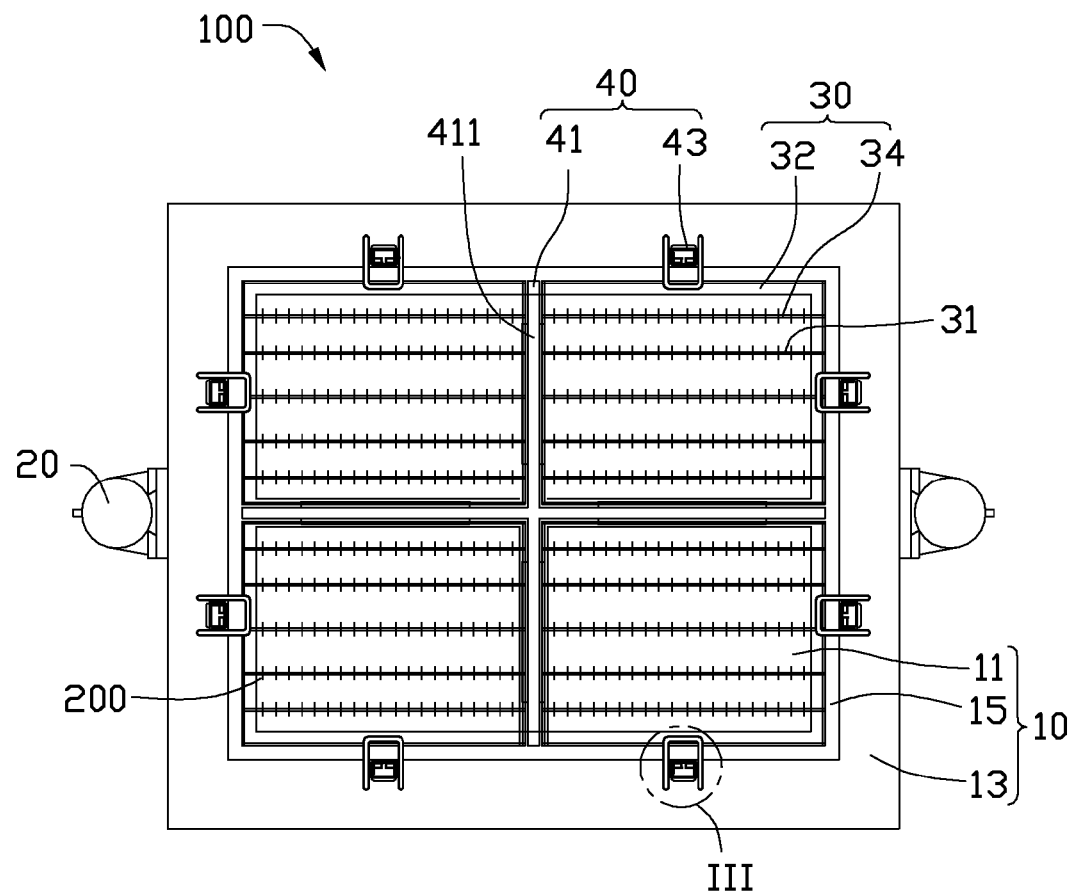
FIG. 2 is a top view of the composite part separating device shown in FIG. 1, but the shell is removed.

FIGS. 1-2, show an exemplary embodiment of a composite part separating device 100 for separating a composite product 200, such as insert molded product, into its respective plastic part 202 and metal part 204. The composite part separating device 100 includes a base 10, at least one vibrating motor 20 mounted on the base 10, at least one workpiece support 30, a retaining structure 40 retaining the workpiece support 30 on the base 10. The metal part 204 hangs on the workpiece support 30 to retain the composite product 200 on the workpiece support 30. The vibrating motor 20 drives the base 10 and the workpiece support 30 to vibrate, thus causing the plastic part 202 to be separated from the metal part 204.

The base 10 includes a vibrating board 13 and a retaining board 15 stacked on the vibrating board 13. The vibrating board 13 retains the vibrating motor 20. The retaining board 15 retains the workpiece support 30 on the base 10. The base 10 defines a passage 11 therethrough. The plastic part 202 passes through the base 10 via the passage 11 after the plastic part 202 is separated from the metal part 204. In this exemplary embodiment, the passage 11 includes a first opening 112 defined in the vibrating board 13 and an aligned second opening 114 defined in the retaining board 15. The workpiece support 30 is retained on the retaining board 15 by the retaining structure 40.

In this exemplary embodiment, the number of the workpiece supports 30 is four. Each workpiece support 30 includes a hollow frame 32 and a plurality of hanging rods 34 retained between opposite sides of the frame 32. A plurality of composite products 200 can be hung from each hanging rod 34.

The retaining structure 40 includes a retaining rod 41 and a plurality of fasteners 43. The retaining rod 41 is a cross and includes four retaining arms 411. The retaining rod 41 is retained on the retaining board 15 and spans the passage 11. The fasteners 43 hold the workpiece support 30 on the retaining board 15. Each frame 32 is supported by two adjacent retaining rods 41 and the retaining board 15, and is retained on the retaining board 15 with two fasteners 43.

Figure 3:
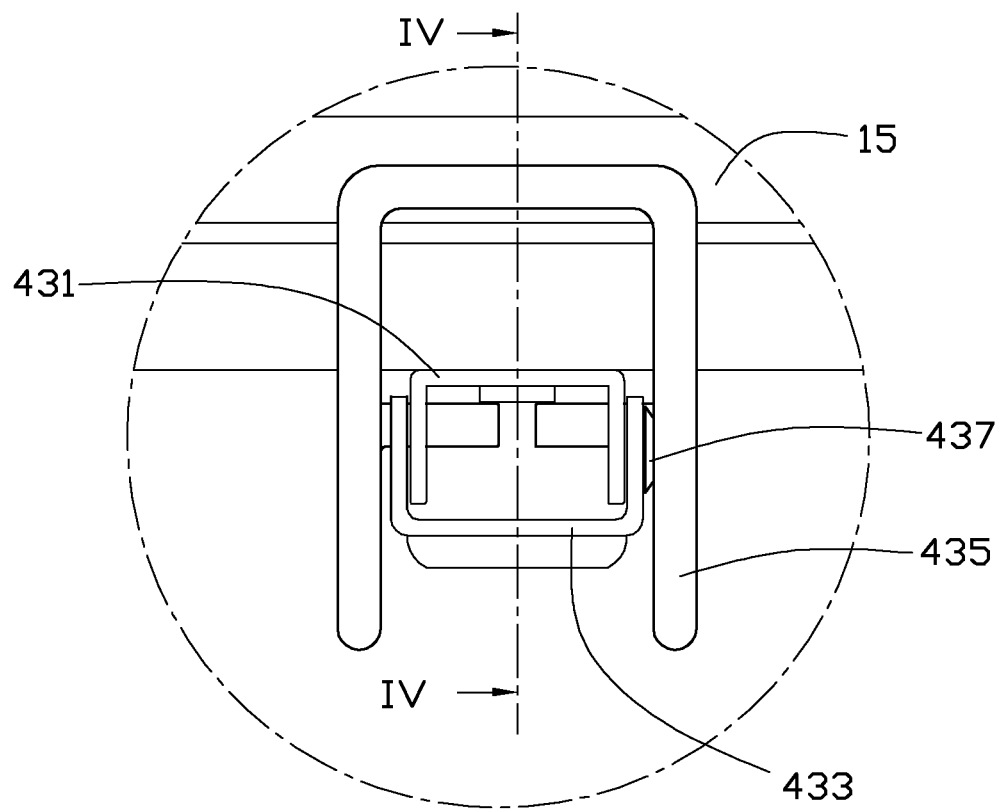
FIG. 3 is a partially enlarged view of the composite part separating device of FIG. 2 in an area of III.
Figure 4:
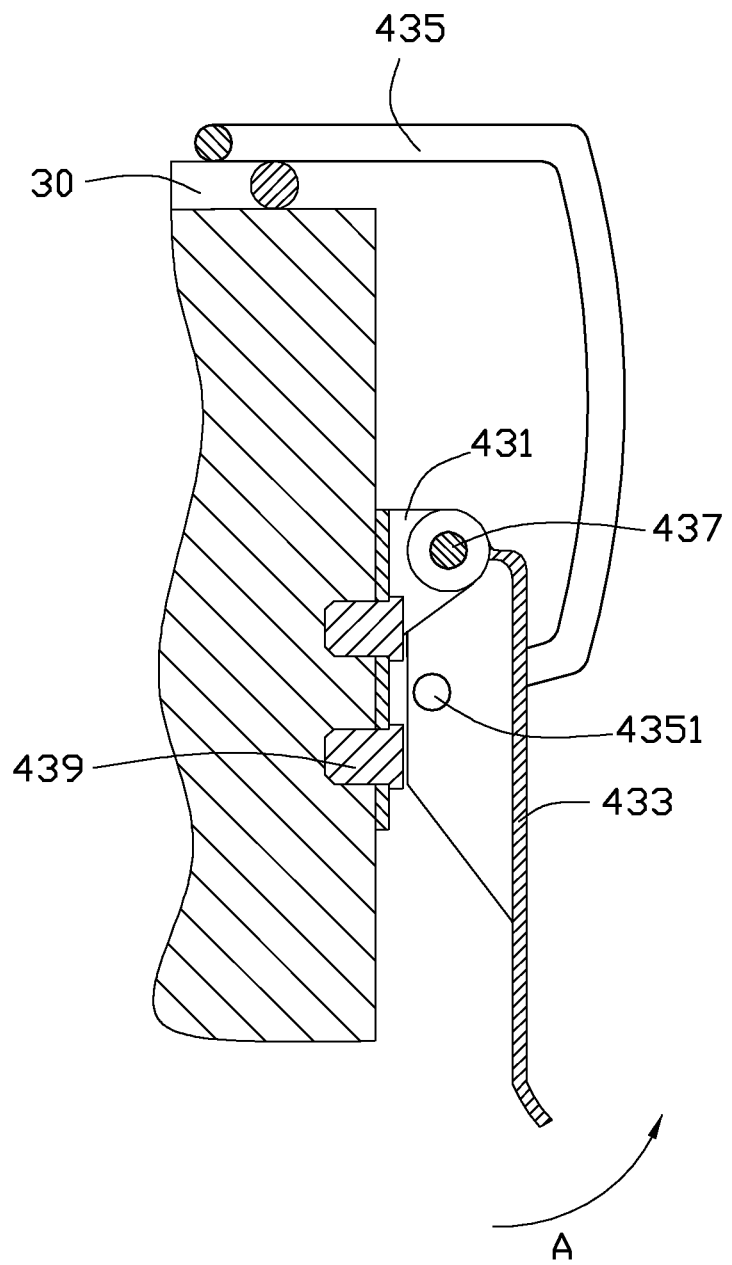
FIG. 4 is a cross-sectional view of the composite part separating device taken along the line IV-IV of FIG. 3.
Figure 5:
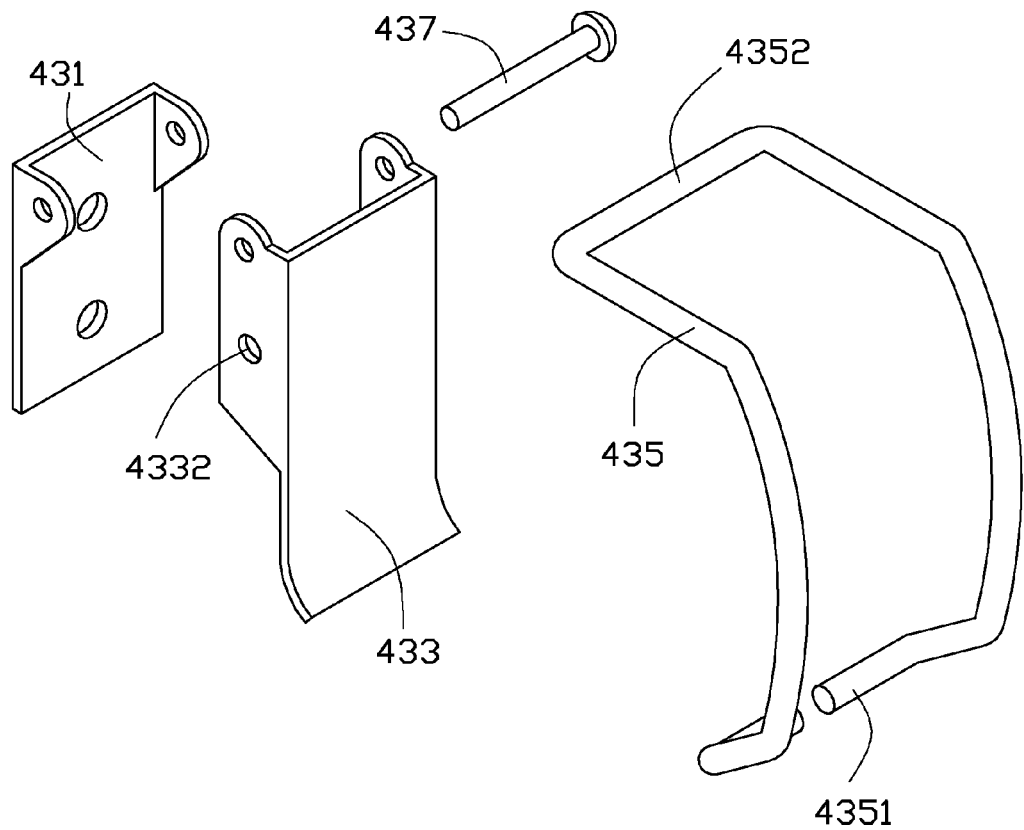
FIG. 5 is an exploded view of a fastener of the composite part separating device shown in FIG. 2.

Referring to FIGS. 3 to 5, in this exemplary embodiment, each fastener 43 includes a retaining element 431, a handle 433, a latching element 435 and a shaft 437. Each retaining element 431 may be retained on the retaining board 15 with screws. The handle 433 is rotatably mounted to the retaining element 431 by the shaft 437. Each latching element 435 is substantially U-shaped, and includes two mounting poles 4351 respectively protruding from two ends facing toward each other. The mounting poles 4351 are held in two mounting holes 4332 of corresponding handle 433, so each latching element 435 is rotatably mounted on corresponding handle 433. A center portion of each latching element 435 is bent toward the two ends to form a latching portion 4352, which secures the workpiece support 30 on the retaining board 15. To release the workpiece support 30 from the latching element 435s, the handles 433 are rotated around corresponding shafts 437 in a direction of arrow A. In contrast, the workpiece support 30 will be secured by the latching elements 435 when the handles 433 are rotated around corresponding shafts 437 in an opposite direction of arrow A.

Referring back to FIG. 1, the composite part separating device 100 may further include at least one supporting board 50 and at least one damper spring 60. The supporting board 50 supports the base 10. Each damper spring 60 is located between a supporting board 50 and the base 10 to decrease the shock force between the base 10 and the supporting board 50.

The composite part separating device 100 may further include a funnel 70 mounted below the vibrating board 13 aligned with the passage 11, and a collecting box 80 located below, aligned with the funnel 70. After the plastic part 202 is removed from the metal part 204, the removed plastic part 202 passes through the passage 11 and the funnel 70 in turn, until it reaches the collecting box 80.

The composite part separating device 100 may further include a shell 90 covering the base 10 and the workpiece support 30. The shell 90 is used to prevent harmful gas from emission from the composite part separating device 100.

In this exemplary embodiment, a maximum rated force of each motor 20 is 1.5 kN, a rated power of each motor 20 is 1.12 kW, a rated current of each motor 20 is 0.4 amps, and a synchronous speed of each motor 20 is 3000 revolutions per minute.

To remove the plastic part 202 from the metal part 204, the motor 20 starts to drive the base 10 to vibrate so the workpiece support 30 on the base 10 vibrates until the plastic part 202 is removed from the metal part 204. As a result, the metal part 204 can be recycled after the plastic part 202 is removed.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A composite part separating device for separating a composite product comprising a plastic part and a metal part, the metal part and plastic part separating device comprising:
    a base comprising a vibrating board and a retaining board stacked on the vibrating board;
    a workpiece support mounted on the base, the metal part of the composite product hung on the workpiece support to retain the composite product on the workpiece support;
    a vibrating motor retained on the vibrating board and driving the base and the workpiece support to vibrate, causing the plastic part separating from the metal part;
    wherein the retaining board retains the workpiece support on the base.

2. The metal part and plastic part separating device of claim 1, wherein the base defines a passage therethrough, to allow the plastic part passing through the passage after the plastic part is separated from the metal part.

3. The metal part and plastic part separating device of claim 2, wherein the passage includes a first opening defined in the vibrating board and an aligned second opening defined in the retaining board.

4. The metal part and plastic part separating device of claim 2, further comprising a retaining structure, the workpiece support is retained on the retaining board by the retaining structure.

5. The metal part and plastic part separating device of claim 4, wherein the workpiece support includes a hollow frame and a plurality of hanging rods retained between opposite sides of the frame; the metal part is hanged on the hanging rods.

6. The metal part and plastic part separating device of claim 5, wherein the retaining structure includes a retaining rod and a plurality of fasteners; the retaining rod is retained on the retaining board and spans the passage; the fasteners hold the workpiece support on the retaining board.

7. The metal part and plastic part separating device of claim 6, wherein each fastener includes a retaining element, a handle, a latching element and a shaft; each retaining element is retained on the retaining board, each handle is rotatably mounted to the retaining element by one shaft, each latching element secures the workpiece support on the retaining board.

8. The metal part and plastic part separating device of claim 7, wherein each latching element is substantially U-shaped, and includes two mounting poles respectively protruding from two ends thereof and toward each other; each handle defines two mounting holes, the mounting poles are held in two mounting holes of corresponding handle so each latching element is mounted on corresponding handle.

9. The metal part and plastic part separating device of claim 8, wherein a center portion of each latching element is bent toward two ends thereof to form a latching portion which secures the workpiece support on the retaining board.

10. The metal part and plastic part separating device of claim 2, further comprising a funnel mounted below the vibrating board and aligned with the passage, and a collecting box located below the funnel to receive separated plastic parts passing through the passage and the funnel.

11. The metal part and plastic part separating device of claim 1, further comprising at least one supporting board and at least one damper spring; the supporting board supports the base, each damper spring is located between one supporting board and the base to decrease the shocking force between the base and the supporting board.

12. The metal part and plastic part separating device of claim 1, further comprising a shell covering the base and the workpiece support to prevent harmful gas from emission from the metal part and plastic part separating device.

13. The metal part and plastic part separating device of claim 1, wherein, a maximum rated force of each vibrating motor is 1.5 kN, a rated power of each vibrating motor is 1.12 kW, a rated current of each vibrating motor is 0.4 amps, and a synchronous speed of each vibrating motor is 3000 revolutions per minute.

* * * * *